Patented Nov. 17, 1942

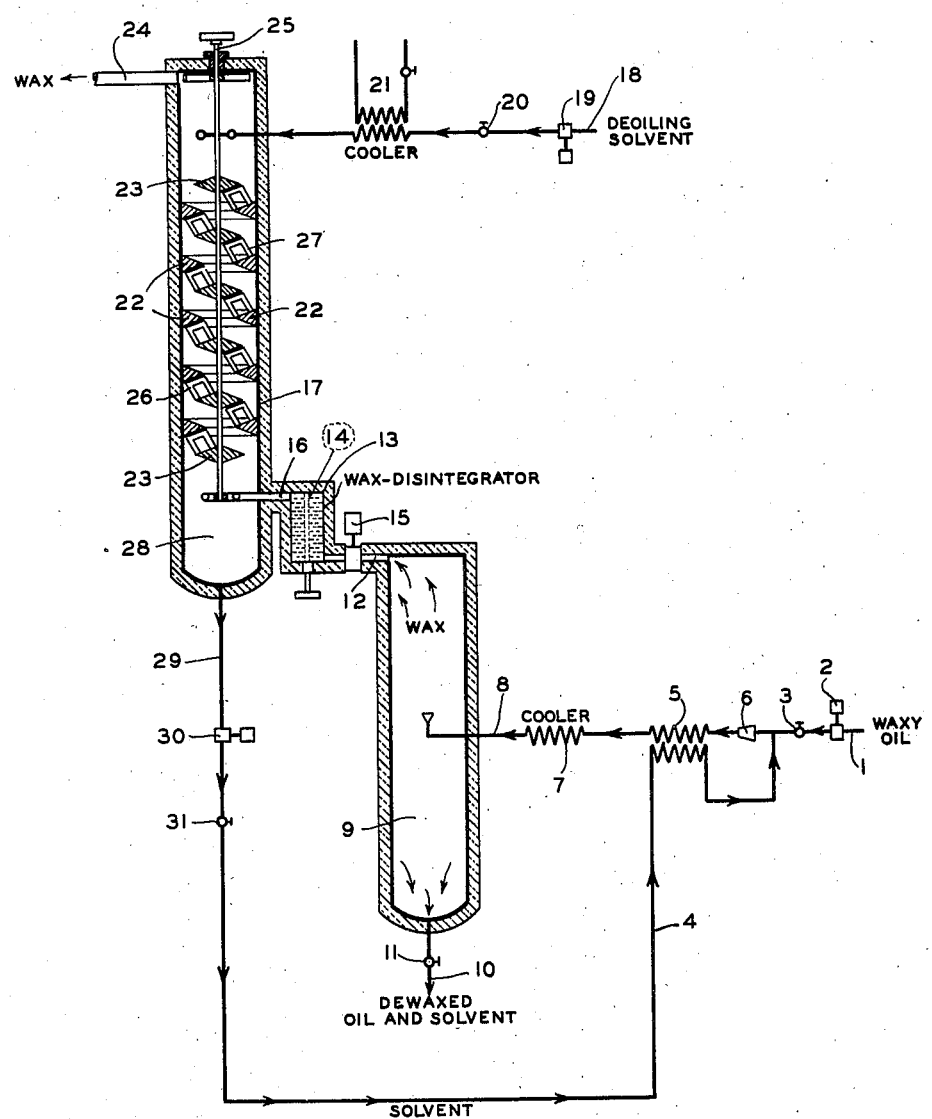

2,302,433

UNITED STATES PATENT OFFICE 2,302,433

PROCESS OF SEPARATING WAXES FROM OILS

Eddie M. Dons and Oswald G. Mauro, Tulsa, Okla., assignors to Mid-Continent Petroleum Corporation, Tulsa, Okla., a corporation of Delaware Application December 26, 1941, Serial No. 424,399

5 Claims. (Cl. 196—18)

This invention relates to processes of separating waxes from oils. The invention may be employed in separating wax and oil found in various kinds of materials including mineral oils, petrolatum, slack wax and vegetable waxes. It can be conveniently used in dewaxing petroleum lubricating oils to produce low pour point lubricants, or in obtaining high melting point waxes from petrolatum, and in separating constituents of slack wax, as well as in the treatment of other products to separate waxy materials.

In this art, it is customary to resort to filtering operations which do not remove all of the oil from the wax. A large mass of precipitated wax is usually deposited on the filter in the form of clusters of interlocked wax crystals with oil-retaining cavities inside of the clusters, and additional bodies of diluted oil are trapped between the clusters on the filter. A substantial percentage of the oil is thus retained in the mass of wax.

An object of the present invention is to avoid the expense and trouble heretofore involved in the use of extremely large filters to separate the body of diluted oil from the wax, at the same time providing a less expensive system wherein the oil is more effectively removed from the wax particles. More specifically stated, an object is to provide a commercially feasible improvement including the steps of separating dewaxed oil solution from coalesced wax crystals, forcibly disintegrating the coalesced wax to positively liberate trapped or occluded oil solution, and thereafter deoiling the disintegrated wax particles. A simple settling operation may be employed to separate free oil solution from the coalesced wax particles, while a more active counterflow of wax and deoiling solvent is employed as a cooperative step to forcibly remove the liberated oil solution from the disintegrated wax particles.

With the foregoing and other objects in view, the invention comprises the novel process hereinafter more specifically described and shown in the accompanying drawing, which illustrates one form of the invention. However, it is to be understood that the invention comprehends changes, variations and modifications within the scope of the claims hereunto appended.

Briefly stated, the preferred form of the invention includes the steps for precipitating the wax in a cooled dewaxing solution, extracting the main body of relatively free oil solution from coalesced wax crystals, and thereafter subjecting the wax to forcible disintegrating and deoiling operations wherein previously trapped solution is forcibly removed from the wax.

In comparing this process with the usual filtering systems wherein a solvent is sprayed onto the wax deposited on the surface of the filter, it will be observed that the so called "wax cake" on the filter is in the form of a compact body of wax clusters with oil particles trapped, or occluded, throughout the mass of wax, and that the spray of solvent can not effectively remove such oil. This is quite different from the very simple cleansing action which occurs when a stream of the wax clusters and oil solution is merely discharged into a settling zone where the wax clusters readily separate from the relatively free oil solution, and then pass to a disintegrating zone associated with a deoiling zone where each minute wax particle is exposed to the forcible cleansing action of a counterflowing solvent stream. In this manner we can positively remove and economically recover a substantial percentage of valuable oil which ordinarily remains as an impurity in the wax.

It is to be understood that such unusual efficiency in removing and purifying the wax also increases the yield of dewaxed oil, and in many cases the main object is to remove and recover the optimum percentage of dewaxed oil, without resorting to expensive refining operations.

The wax may be precipitated in any desired manner and at any suitable temperature, a low temperature being required in dewaxing lubricating oils to produce low pour point lubricants, while much higher temperatures are usually desired for the precipitation of high melting point wax in petrolatum, or in the separation of high melting point wax from low melting point wax which may or may not contain a substantial percentage of oil. As previously indicated, the precipitated wax particles are in the form of clusters, and the gravity separation of the wax and dewaxed solution may be due to a relatively high density of the solution, or to a relatively high density of the wax particles. Advantages are gained in a true counterflow wherein a rising stream of wax particles contacts directly with a continuous descending stream of cleansing solvent, but this condition may be reversed, and various types of batch systems could be employed to obtain some of the advantages of the invention.

However, the preferred form of the invention includes the step of precipitating wax in a solution, followed by gravity separation of coalesced wax from free portions of the solution, and then forcibly disintegrating a continuous stream of the coalesced wax to release the trapped oil solution before the wax reaches a countercurrent deoiling zone.

The countercurrent deoiling operation may be carried out to any desired extent, depending upon economic conditions or the nature of the products sought in the process. In some cases, more or less of the oil may be deliberately retained in the wax, thereby reducing the time factor in the countercurrent deoiling zone where the liberated oil solution is forcibly removed from the disintegrated wax particles.

To most effectively establish and maintain the new combination of conditions, the nature of the solvents requires consideration, not with the idea of producing filterable wax, but to provide for comparatively rapid movements of the wax and other conditions in the new process. The density or specific gravity of the solvent is an important consideration in the step of causing the rapid gravity separation of the wax from the dewaxing solution, and also in the subsequent step of passing the stream of disintegrated wax particles through a counterflowing stream of cleansing solution. The viscosity of the solution and solvent even at very low temperatures, is another factor that should not prevent the desired free and rapid movements of the wax particles. Another property of the solvent relates to the interfacial tension existing between the wax particles and the oil solution, or between said wax particles and the cleansing solvent. This interfacial tension is a subject separate and distinct from the viscosity, and it should not be high enough to interfere with said free and rapid movements of the wax particles, even when the process is carried out at very low temperatures, such as 0° F., or lower. However, the invention is not limited to a particular solvent, as the various properties can be obtained from numerous different solvents.

Illustrations of suitable solvents include methylene dichloride combined with dichlorethyl ether or sulfur dioxide; methylene dichloride combined with acetone, or with isopropyl acetate and dichlorethyl ether; sulfur dioxide mixed with dichlorodifluoromethane, or with perchlorethylene; or a mixture of dichlorethyl ether and perchlorethylene. Mixtures of three or more solvents may be employed. However, for convenience in commercial practice, methylene dichloride and dichlorethyl ether (chlorex) provide a desirable combination of only two solvents.

The accompanying drawing is a diagrammatical view of a system which may be employed to carry out one form of the invention.

A continuous regulated stream of the wax-bearing charging stock, for example, a lubricating oil stock, enters the system through a pipe 1 which may be provided with a pump 2 and a regulating valve 3. A continuous stream of selective dewaxing solvent, from sources to be hereafter described, may be conducted through a pipe 4 and heat exchanger 5 to the oil supply pipe 1. The continuous streams of oil and dewaxing solvent are united in the pipe 1 and transmitted through a mixing nozzle 6 where the oil and solvent are mixed at a temperature high enough to form the desired dewaxing solution.

The continuous stream of solution is transmitted through a heat exchanger 5 for preliminary cooling. Thereafter, the stream of solution passes through a cooler, or chiller, 7 where the flowing solution is cooled to a temperature desired for precipitation of wax in the liquid solution. The wax crystals are thus coalesced to form relatively large clusters, with portions of the liquid oil solution trapped or occluded in the wax clusters.

If desired, the resultant mixture of solution and precipitated wax clusters may be transmitted through a pipe 8 arranged to conduct a continuous stream of the wax clusters and solution into a settling chamber 9. This chamber 9 may be in the form of an upright column covered with insulation.

The incoming stream of chilled solution and wax may be delivered from the pipe 8 to the settling chamber 9 at approximately the temperature selected for precipitation of wax in the cooler, or chiller, 7. For example, this temperature may be about 0° F., and we prefer to insulate the chamber 9 to maintain the desired dewaxing temperatures therein.

We are assuming that a relatively dense or heavy solvent has been selected for the dewaxing operation, and that the viscosity and interfacial tension are low enough to allow the wax to freely rise in the dense solution. In this event, the major portion of the free oil solution will readily move downwardly to the bottom of the settling compartment 9 where it is discharged through a pipe 10, said pipe having a regulating valve 11 adjusted to regulate the flow therein. This outgoing solution is free of wax and it may be distilled in any suitable manner to remove the solvent from the dewaxed oil. It will be observed that most of the oil is very easily, quickly and economically dewaxed in the simple settling chamber 9, and immediately discharged from the dewaxing system.

Attention is now directed to the separating zone, or dewaxing zone established near the point where the incoming mixture of cooled solution and wax enters the settling chamber 9. The mass of wax particles moves upwardly and carries with it portions of the solution, including oily films around the wax particles and relatively free portions of the solution between the rising wax particles.

The rising mass of wax clusters, or wax particles, coalesces and occludes portions of the liquid oil solution in the settling chamber 9. However, a continuous stream of the coalesced wax and oil solution is discharged through a pipe 12 at the upper portion of said chamber 9 to a separate disintegrating chamber 13 containing a rotary wax breaker 14 whereby the coalesced wax is forcibly disintegrated to positively liberate the occluded oil solution from the wax clusters. The disintegrating chamber 13 is covered with insulation, and a pump may be employed to positively force a continuous stream of waxy material into said chamber.

The resultant continuous stream of disintegrated wax particles and liberated oil solution is discharged through a pipe 16 which forms the inlet of a countercurrent deoiling system, including an insulated chamber 17. This countercurrent system may be designed to transmit a continuous stream of relatively heavy selective oil solvent through a rising stream of lighter wax particles. For example, a regulated stream of selective oil solvent may be transmitted through a pipe 18 provided with a pump 19, regulating valve 20, and cooler 21 through which the solvent stream is conducted into an upper portion of the chamber 17.

When a heavy deoiling solvent is employed, the stream of deoiling solvent from the cooler 21 will descend in direct contact with the rising stream of disintegrated wax particles, so as to selectively dissolve the free portions of oil solution carried by the wax, and also forcibly scrub the oily films from the rising wax particles. This action may be aided by any suitable mechanical appliances. For example, the upper portion of the chamber 17 may be provided with alternating baffles including a series of rings 22 extending inwardly from the inner face of the chamber 17 and a series of central baffle members 23 arranged as shown in the drawing to produce an elongated tortuous passageway wherein the rising wax particles move back and forth in a zigzag course. The stream of selective deoiling solvent descends through the rising stream of wax particles, and the counterflowing streams are divided into numerous layers of different specific gravities contacting with each other and advancing in intersecting paths as they flow from one baffle to another. These baffles are preferably provided with upwardly inclined top and bottom faces to permit free movement of the rising wax particles. It will be observed that the rising layers of wax particles move upwardly while in contact with the upwardly inclined bottom faces of the baffles, and that said wax particles repeatedly intersect the descending solvent while rising from one upwardly inclined plane to another. The deoiled wax may be discharged through a pipe 24 above the inlet for the deoiling solvent.

The inclined faces of the baffles tend to prevent the wax particles from clinging to said baffles. However, any suitable mechanical means may be employed to prevent or limit the growing of wax crystals which might otherwise extend from the bottom faces of the baffles. For example, the central baffles 23 may be fixed to a slowly rotating shaft 25, so as to rotate with the shaft, and scrapers 26 may extend from the top faces of these rotary baffles to remove waxy material from the bottoms of the stationary baffle rings 23. These stationary baffles may be likewise provided with scrapers 27 extending from their top faces to remove waxy material from the bottom faces of the rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles.

An interesting condition appears in the effective cleansing of the disintegrated wax particles due to the forcible scrubbing and dissolving action of the selective deoiling solvent which repeatedly crosses the path of the wax in the deoiling zone. Attention is also directed to the condition at the lower portion of this deoiling zone where the outgoing solvent stream is diverted from the disintegrating and settling zones. The used deoiling solvent and its dissolved oil solution may descend through a settling zone below the wax inlet pipe 16, and pass out as a separate stream through a discharge pipe at the bottom of said settling zone. Any of the relatively light wax particles swept into the settling zone 28 will eventually rise to the counterflow zone, instead of descending to the discharge pipe 29.

A substantial advantage may be gained by transmitting the used deoiling solvent and its dissolved oil from the counterflow deoiling zone to the incoming stream of wax-containing oil, so as to provide or complete the continuous stream of dewaxing solvent. As a diagrammatical illustration of this feature we have shown a pump 30 arranged to force a continuous stream of the used dewaxing solution from the discharge pipe 29 and through a regulating valve 31 to the pipe 4, thereby transmitting the used deoiling solvent, and the oil recovered therein, to the incoming oil stream. The oil recovered in the deoiling zone is thus returned to the system, while the selective deoiling solvent economically is employed in forming the selective dewaxing solution.

We claim:

1. In the art of separating wax and oil, the continuous process of dewaxing the oil and deoiling the wax which comprises precipitating the wax in a liquid solution of the oil and a selective dewaxing solvent, introducing a continuous stream of the liquid oil solution and wax into a settling chamber, causing the wax to separate from the free portion of said liquid solution in said settling chamber, discharging the dewaxed oil solution from said settling chamber, while allowing the waxy material to coalesce and occlude portions of the liquid oil solution in said settling chamber, discharging a stream of the coalesced wax from said settling chamber to a disintegrating chamber, forcibly disintegrating the coalesced wax in said disintegrating chamber to positively liberate the occluded oil solution from the wax, transmitting a continuous stream of the disintegrated wax particles and liberated oil solution into a countercurrent deoiling system, transmitting a continuous stream of selective deoiling solvent through the disintegrated wax particles in said countercurrent deoiling system, while causing said selective deoiling solvent and disintegrated wax particles to flow in opposite directions in contact with each other, thereby causing the counterflowing deoiling solvent to dissolve and remove liberated oil solution carried by the disintegrated wax particles, discharging said disintegrated wax particles from said stream of deoiling solvent, and separately discharging the used stream of deoiling solvent from the course of said disintegrated wax particles, while diverting said used stream from the outlets of said settling chamber and disintegrating chamber.

2. In the art of separating wax and oil, the continuous process of dewaxing the oil and deoiling the wax which comprises precipitating the wax in a liquid solution of the oil and a selective dewaxing solvent, thereby occluding portions of the oil solution in relatively large clusters of coalesced wax crystals, introducing a continuous stream of the liquid solution and wax clusters into a settling zone, causing said wax clusters to separate from the free liquid solution in said settling zone, discharging a stream of the dewaxed oil solution from said settling zone, transmitting a stream of the wax clusters from said settling zone to a disintegrating chamber and forcibly disintegrating the clusters in said chamber to positively liberate the occluded oil solution from the wax, transmitting a continuous stream of the disintegrated wax particles and liberated oil solution into a countercurrent deoiling system, transmitting a continuous stream of selective deoiling solvent through the disintegrated wax particles in said countercurrent deoiling system, while causing said selective deoiling solvent and disintegrated wax particles to flow in opposite directions in contact with each other, thereby causing the counterflowing deoiling solvent to remove and dissolve the liberated oil solution carried by the disintegrated wax particles, discharging said disintegrated wax particles from said stream of deoiling solvent, and separately discharging the used stream of deoiling solvent from the course of said disintegrated wax particles, while diverting said used stream from the outlets of said settling zone and disintegrating chamber.

3. In the art of dewaxing oils and deoiling the wax, the process which comprises maintaining a settling zone in communication with a counterflow deoiling zone, while dewaxing the oil in said settling zone and deoiling the wax in said counterflow deoiling zone, said process including the steps of precipitating waxy material in a relatively heavy solution of the oil and a dewaxing solvent, transmitting a mixture of the liquid oil solution and waxy material into said settling zone, causing relatively free oil solution to drop by gravity from the wax in said settling zone, discharging a stream of the dewaxed oil solution from a lower portion of said settling zone, causing said wax to rise above the dewaxed solution in said settling zone, allowing the rising waxy material to coalesce and occlude portions of the liquid oil solution in said settling zone, discharging a stream of coalesced wax from said settling zone to a disintegrating chamber, forcibly disintegrating the coalesced wax in said disintegrating chamber to positively liberate occluded oil solution from the wax, transmitting a continuous stream of the disintegrated wax particles and liberated oil solution into the entrance of a counterflow deoiling zone, causing the wax particles to rise in said counterflow deoiling zone, while transmitting a descending stream of relatively heavy deoiling solvent through the disintegrated mass of rising wax particles, thereby selectively extracting liberated oil solution from the disintegrated wax particles in said counterflow deoiling zone, discharging the rising wax particles from an upper portion of said deoiling zone, and discharging a stream of used deoiling solvent from a lower portion of said counterflow deoiling zone, while diverting the last mentioned stream from said disintegrating chamber.

4. In the art of dewaxing oils and deoiling the wax, the process which comprises maintaining a settling zone in communication with a counterflow deoiling zone, while dewaxing the oil in said settling zone and selectively deoiling the wax in said counterflow deoiling zone, said process including the steps of dissolving a stream of the wax-containing oil in a selective dewaxing solvent, cooling the resultant solution to precipitate relatively light wax in the liquid solution, thereby occluding portions of the solution in relatively large clusters of coalesced wax crystals, transmitting a mixture of the liquid solution and wax clusters into said settling zone, causing relatively heavy dewaxed solution to drop by gravity from the wax clusters in said settling zone, discharging said dewaxed solution from a lower portion of said settling zone, while causing said wax clusters to rise above the dewaxed solution in said settling zone, discharging the wax clusters into a separate disintegrating chamber and forcibly disintegrating the clusters in said separate chamber to positively liberate occluded oil solution from the wax independently of the flow through said settling and counterflow zones, transmitting the disintegrated wax particles and liberated oil solution into said counterflow deoiling zone, causing the disintegrated wax particles to rise in said counterflow deoiling zone, while transmitting a descending stream of relatively heavy selective deoiling solvent through the mass of rising wax particles, thereby subjecting a rising stream of the disintegrated wax particles to a selective deoiling operation in said counterflow deoiling zone, discharging the rising stream of wax particles from said counterflow deoiling zone, and separately discharging a continuous stream of the used deoiling solvent and its dissolved oil from said counterflow zone.

5. In the art of dewaxing oils and deoiling the wax, the process which comprises maintaining a settling zone in communication with a counterflow deoiling zone, while dewaxing the oil in said settling zone and selectively deoiling the wax in said counterflow deoiling zone, said process including the steps of dissolving a stream of wax-bearing oil in a selective dewaxing solvent, precipitating wax in a liquid solution of said oil and selective dewaxing solvent, thereby occluding portions of the liquid oil solution in clusters of coalesced wax crystals, transmitting a mixture of the liquid oil solution and wax clusters into said settling zone, causing free oil solution to separate from the wax clusters in said settling zone, discharging the dewaxed solution from said settling zone, while transmitting a continuous stream of the wax clusters with their occluded portions of oil solution into a disintegrating chamber, forcibly disintegrating the clusters in said disintegrating chamber to positively liberate occluded oil solution from the wax, transmitting the disintegrated wax particles and liberated oil solution into said counterflow deoiling zone, causing a stream of the disintegrated wax particles to flow through said counterflow deoiling zone, while transmitting a counterflowing stream of selective oil solvent through the stream of disintegrated wax particles, thereby subjecting the disintegrated wax particles to a selective deoiling operation in said counterflow deoiling zone, continuously discharging used selective deoiling composition from the stream of disintegrated wax particles in said counterflow deoiling zone, and continuously mixing said used deoiling composition with said stream of wax-bearing oil to provide a continuous stream of said selective dewaxing solvent.

EDDIE M. DONS.
OSWALD G. MAURO.